United States Patent
Persson

[15] 3,667,377
[45] June 6, 1972

[54] TYING MECHANISM FOR BALES

[72] Inventor: Bengt Ake Persson, Traktorgatan, Sweden
[73] Assignee: Personer AB, Ystad, Sweden
[22] Filed: Mar. 15, 1971
[21] Appl. No.: 124,407

[52] U.S. Cl. ................................. 100/19, 100/31, 100/192
[51] Int. Cl. ...................................................... B65b 13/28
[58] Field of Search ............... 100/17, 18, 19, 24, 29, 31, 100/192; 56/448, 453

[56] References Cited

UNITED STATES PATENTS

| | | |
|---|---|---|
| 2,173,393 | 9/1939 | Fraula ............................... 100/19 X |
| 2,595,503 | 5/1952 | Altgelt .............................. 100/19 X |
| 2,621,588 | 12/1952 | McClellan et al. ................ 100/19 X |
| 3,528,364 | 9/1970 | Freund .............................. 100/17 X |
| 3,587,448 | 6/1971 | Hemphill et al. .................. 100/17 X |

Primary Examiner—Billy J. Wilhite
Attorney—Jones and Lockwood

[57] ABSTRACT

A bale tying mechanism in a bale press comprises a reciprocable forked needle which forms against three spaced intercepting members two standing wire loops in the spaces between the intercepting members. The intermediate intercepting member has co-operating cutting members for severing the wire forming the loops where such wire engages the intermediate intercepting member.

3 Claims, 12 Drawing Figures

TYING MECHANISM FOR BALES

The present invention relates to tying of bales which are compacted in a bale case against bound bales being fed through the bale case against an applied back pressure.

At present when tying bales a wire extended at one side of the bales is formed to a loop behind each completed bale transversely of the feeding direction of the bales, and such wire is manually locked around the bale by severing the wire loop to provide between two successive bales two free wire ends and manually twisting these wire ends to form a knot at the forward and rearward end, respectively, of a bale at the other side thereof. Although the loop forming operation of this tying method is accomplished automatically by means of machinery, the tying steps have to be performed manually to a substantial part.

An object of the present invention is to provide a complete automatic tying operation and, therefore, there is provided according to the invention in a bale press having a bale case and a plunger reciprocable in said bale case and forming at least one groove in the face thereof, a tying mechanism for bales comprising at least one needle reciprocable through said groove from one of two opposite sides of the bale case transversely thereof, said needle being forked to provide two legs; means for supplying a first wire to said one side of the bale case; three intercepting members spaced in the longitudinal direction of said bale case at the other one of said opposite sides; means for supplying a second wire to said other side of the bale case, said needle passing through the spaces between said intercepting members to engage said first and second wires and to form thereof two wire loops spaced in the longitudinal direction of said passage; a wire twisting member opposite each of the spaces between said intercepting members for twisting said wire loops individually; two elements displaceable on the central intercepting member for movement towards and away from each other; co-operating cutting members on said elements disposed at the side of said central intercepting member which faces the bale case; and means for displacing said elements towards and away from each other to keep the elements spaced when the wire loops are formed and to thereafter sever the wires by means of the cutting members when said elements are displaced towards each other.

For a better understanding of the invention an embodiment thereof now will be described in detail with reference to the accompanying drawings showing a baler with a tying mechanism according to the invention.

In the drawings

Figure 1:
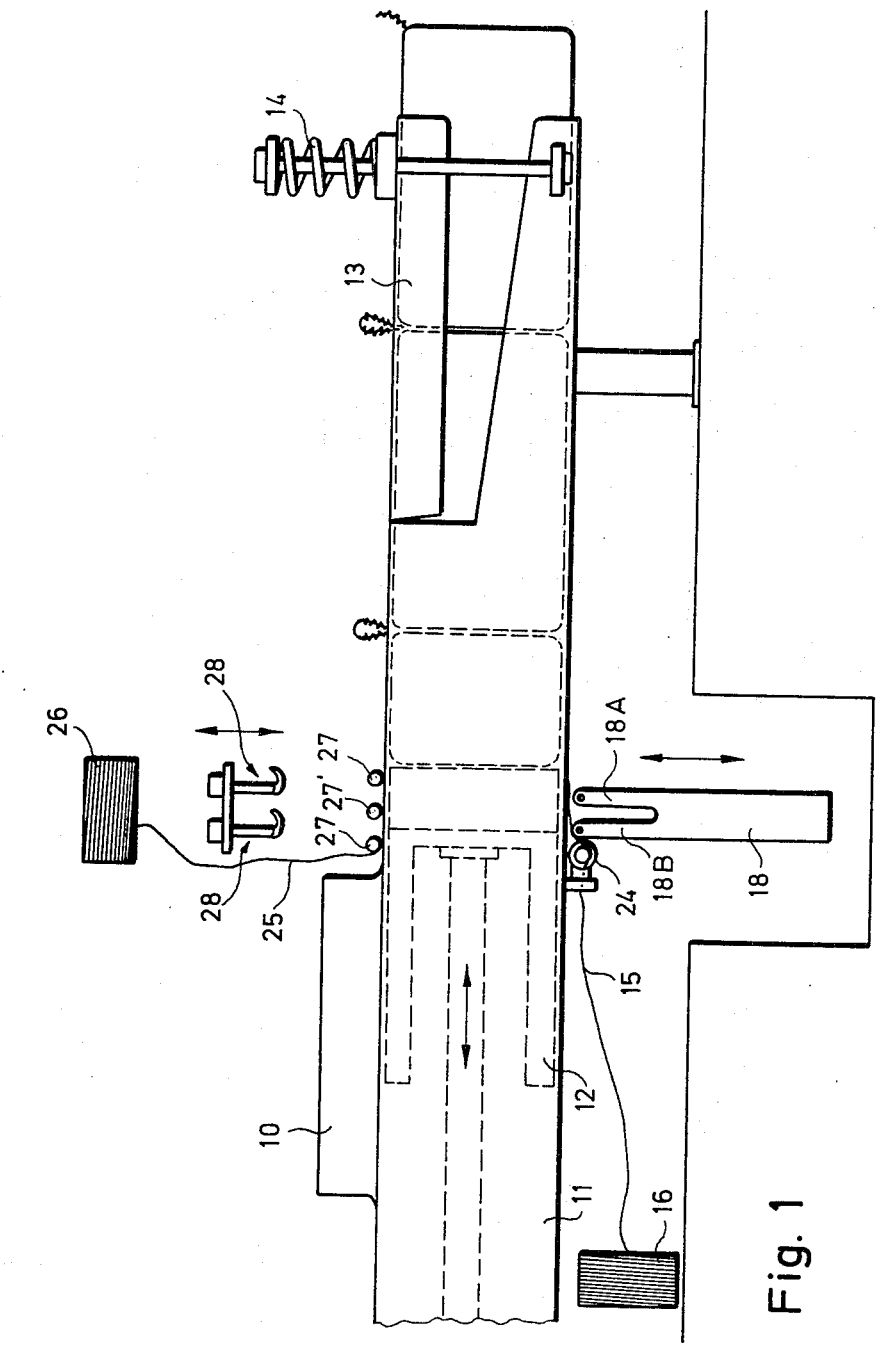
FIG. 1 is a side elevational view of the baler and the tying mechanism.
Figure 2:
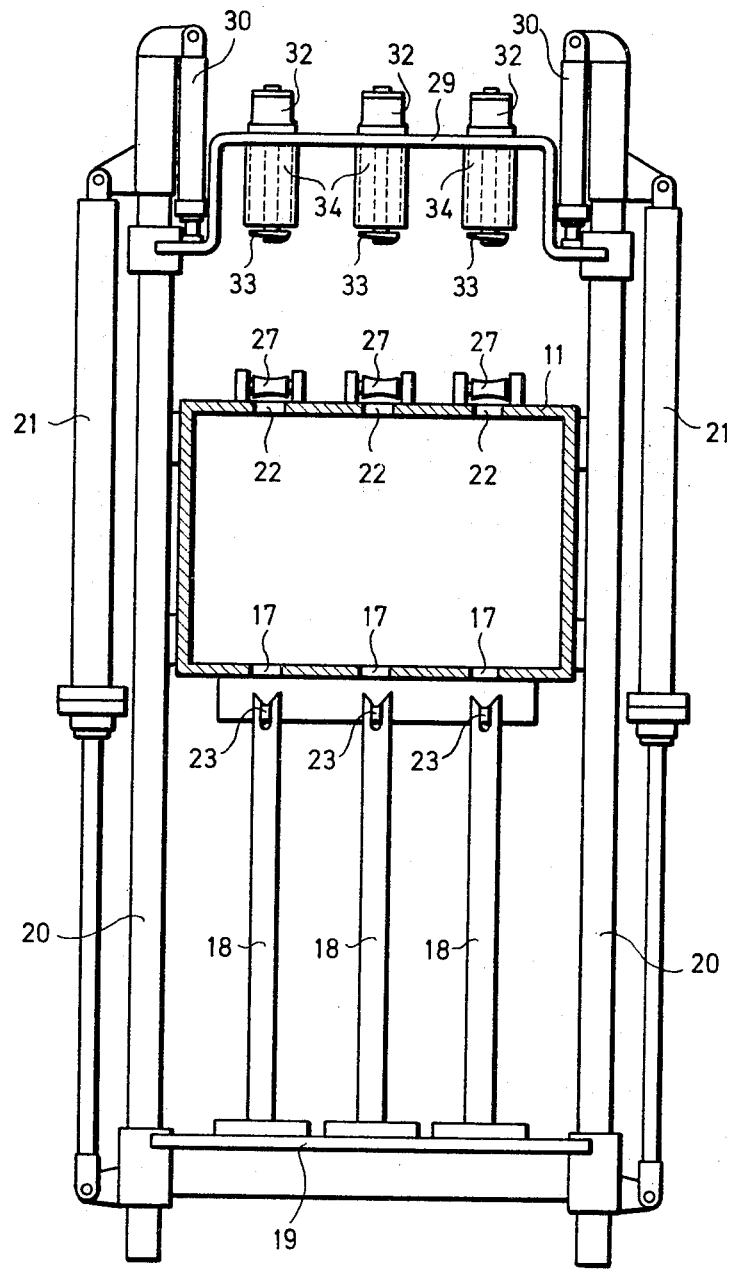
FIG. 2 is an enlarged end view of the apparatus shown in FIG. 1 the bale case being shown in cross section at the place where the needles are moved through the passage of the bale case.
Figure 3:
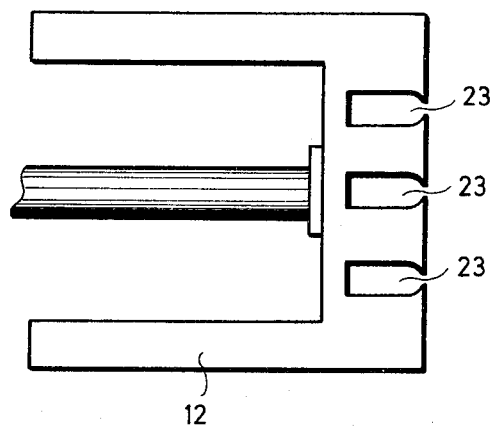
FIG. 3 is an enlarged plan view of the plunger.

Referring to FIGS. 1 to 3 of the drawings the bale press shown therein, which is of the conventional horizontal type, comprises a vertical shaft or hopper 10 for supplying to the baler the material to be baled such as waist paper, metal scrap, crop, or any other material suitable for baling. Shaft 10 communicates at the lower end thereof with the passage of a bale case 11 having rectangular cross sectional form. In the shaft there may be provided means (not shown) for pre-compacting in the shaft the material to be baled when such material is being pushed down into the passage of the bale case. A plunger 12 is reciprocable in bale case 11 past the opening of shaft 10 by means of hydraulic drive means, not shown, to compact the material supplied to the bale case against a back pressure applied to the material in the bale case by the friction of the material against the walls of the bale case, enhanced by a vertically pivoted frictional gate 13 at the discharge end of the bale case such gate being biassed towards the bottom wall of the bale case by means of a helical spring 14. The compacted and bound bales are successively pushed out from the discharge opening of bale case 11.

In order to divide the material compacted in bale case 11 to form thereof bound bales of definite length there is provided in the bale press a tying mechanism operating with a number of parallel bottom wires 15, three wires being shown which are extended individually from a wire supply 16. Each wire passes into bale case 11 through an opening 17 in the bottom wall of the bale case and extends in the longitudinal direction thereof under the compacted material therein. Needles 18 of a number corresponding to the number of wires 15 are provided to pull each bottom wire 15 upwardly between individual bales. These needles are mounted substantially vertically on a needle frame 19 which is guided fro vertical movement on a pair of vertical guides 20 disposed at opposite sides of the bale case and operable by hydraulic rams 21. Each needle is movable through the associated opening 17 in the bottom wall of the bale case. and opposite each of openings 17 there is provided an opening 22 in the top wall of the bale case. As will be seen in FIG. 3 plunger 12 has three grooves 23 in the face thereof. When plunger 12 is in a position wherein said grooves are in register with openings 17 and 22, needles 18 can be moved by hydraulic drive means 21 from below vertically upwardly through the passage of the bale case and the grooves of the plunger to a position wherein the needles project from the upper side of the bale case. Needles 18 are operative to form a loop of each bottom wire 15 when such wire is pulled up through the bale case transversely thereof in a manner known per se in connection with balers of the type described.

Figure 4:
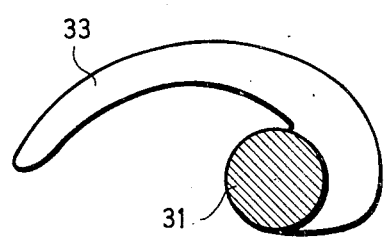
FIG. 4 is an enlarged plan view of a twisting hook, an associated spindle thereof being shown in cross section.

According to the invention each needle is of a specific construction the needle being forked to provide two legs 18A and 18B spaced longitudinally of the bale case. At the free end of each leg there is rotatably mounted a pulley 23A and 23B, respectively, for guiding wire 15 on the needle, and between wire supply 16 and needle 18 there is provided for each wire 15 a pulley 24 rotatably mounted on bale case 11. According to the invention there are provided for the tying of the bale also three top wires 25 which are extended each from a wire supply 26 and pass through openings 22 into the passage of bale case 11 to be disposed at the top side of the material compacted therein. For the guiding of each top wire 25 there are rotatably mounted on bale case 11 three axially registered intercepting members spaced longitudinally of the bale case. Thus, there are provided two end intercepting members 27 and one intermediate intercepting member 27' which are arranged to allow the associated needle 18 to be moved upwardly the legs 18A and 18B thereof passing through the spaces between the intercepting members. Over the two spaces of each set of intercepting members 27 – 27' – 27 there are provided two wire twisters 28 and thus, when three bottom wires 15 and three top wires 25 are provided there are three pairs of wire twisters. The twisters are supported by a twister frame 29 which is guided for movement vertically on guides 20 and are adjustable by means of hydraulic rams 30. Each twister comprises a spindle 31 which is journalled in a bearing casing 32, and the plurality of twisters are rotated over transmission means by a common hydraulic drive motor. At the lower free end of the spindle there is mounted a twister hook 33 formed as a sickle as shown in the plan view of FIG. 4.

Figure 7:
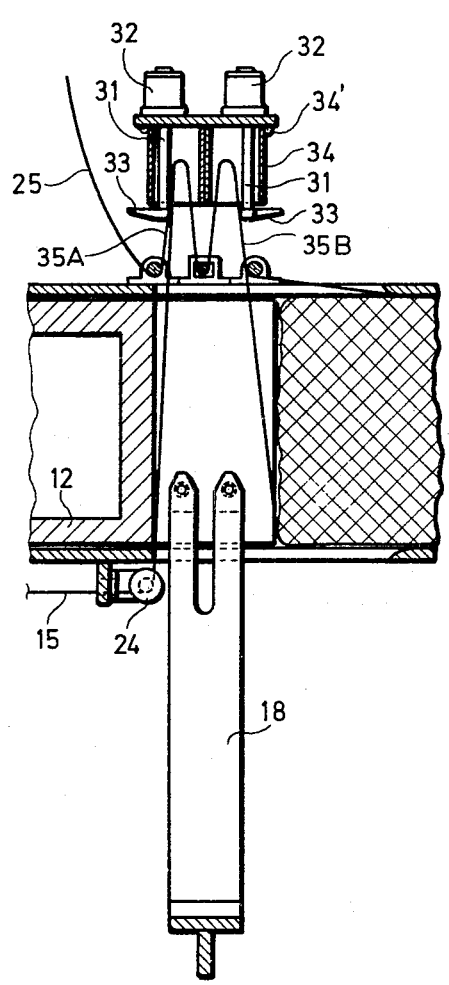
Figure 8:
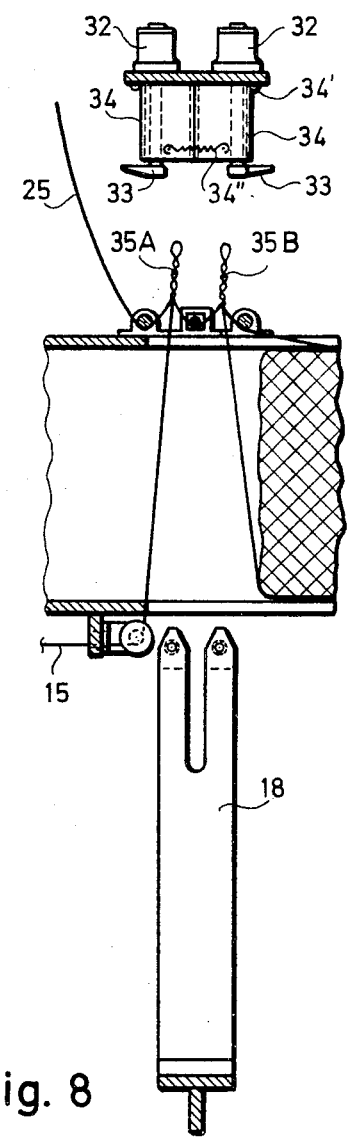

Thus, the twisters are movable vertically to and from a position in the proximity of intercepting members 27 – 27' – 27. Close to each spindle 31 there is provided as a wire abutment a tube 34, the two tubes of a pair of twisters being pivoted at their opposite edges on twister frame 29 at 34' to be swingable towards and from each other and being resiliently biassed towards each other by means of a helical spring 34' for reasons which will be explained later. In this position each tube encloses the associated spindle 31 excentrically as is shown in FIG. 7 (cf. FIGS. 5 to 8).

In the baler described the binding of the bales is performed by means of the tying mechanism according to the invention as described below with reference to the different steps of the method disclosed in FIGS. 5 to 8.

Figures 5, 6:
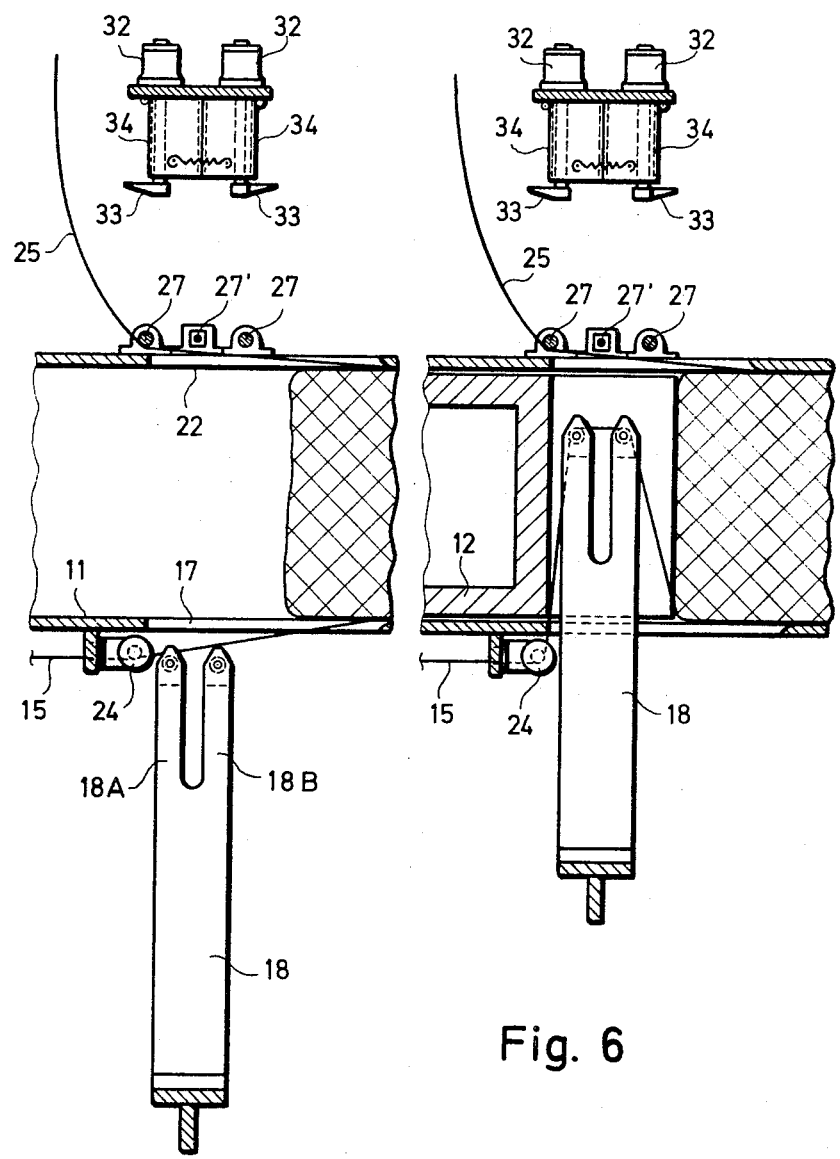
FIGS. 5 to 8 are enlarged axial sectional views of the bale case of the baler and the co-operating members of the tying mechanism disclosing several operational steps of the tying mechanism in a bale tying operation.

It is assumed that behind the bale just completed in bale case 11 there has been compacted material corresponding to a bale length. Bottom wires 15 and top wires 25 extend along the compacted material which shall form the new bale, at the lower and upper sides, respectively, of that material, and needles 18 are in their lowermost position and twisters 28 in their uppermost position as shown in FIG. 5. The material between the proceeding bale and plunger 12 being kept under pressure by the plunger with grooves 23 thereof registering with associated openings 17 and 22, needles 18 are moved vertically in an upward direction by means of hydraulic rams 21 through openings 17 into grooves 23. During this movement bottom wires 15 being disposed over pullies 23A and 23B on legs 18A and 18B of the needles, each will be extended into a loop between the rearward lower edge of the new bale and pully 24, as shown in FIG. 6. During the continued movement through grooves 23 legs 18A and 18B of each needle are raised through the spaces between intercepting members 27 – 27' – 27 and carry top wire 25 on pullies 23A and 23B with them. Against the intercepting members there now will be formed of top wire 25 two wire loops projecting from the spaces between intercepting members 27 – 27' – 27, and against the intermediate intercepting member 27' there will be formed two substantially identical loops of bottom wire 15 such that there are provided two double wire loops 35A and 35B as shown in FIG. 7. Before or after the formation of these loops wire twisters 28 are lowered vertically by means of hydraulic rams 30 such that the needles will be received into tubes 34 whereby spindles 31 of each pair of twisters will be disposed close to the associated wire loops 35A and 35B, respectively, FIG. 7. Then, needles 18 are lowered vertically to their original position leaving the wire loops in a standing position. When the wire twisters subsequently are rotated, for instance 6 revolutions, twister hook 33 brings along the adjacent wire loop. Abutting tube 34 this loop will settle onto spindle 31 and will be wound one turn or so around spindle 31. It should be noted that twister hook 33 will not be threaded into the wire loop but will embrace the same from outside. During the rotation of the wire twisters wire loops 35A and 35B are twisted to form knots. When this has been done the twister spindles are rotated for instance one revolution in the opposite direction to loosen the twisted wire loops from the spindle, and when the wire twisters subsequently are retracted by an upward vertical movement by means of hydraulic rams 30 the twisted wire loops are stripped off from spindles 31 the condition according to FIG. 8 thereby being obtained. It may happen that material from the bale will be drawn up into tubes 34 by wires 15 and needles 18. These tubes are pivotable against the bias of springs 34'' to be able to yield during the rotation of spindles 31 and allow such irrelevant material to rotate during the twisting operation in order to avoid jamming between spindle and tube. As the compacted material in bale case 11 is kept under pressure during the tying operation described it is not necessary to keep wires 15 and 25 under tension during the tying operation. The reason is that when plunger 12 is retracted and bottom wire 15 — extended to a loop through the bale case — passes out of grooves 23 the compacted material will spring back by the inherent resiliency of the bale and the wires tied around the bale just formed will be put under tension to firmly hold the bale tightly compressed.

The arrangement of the three intercepting members 27 – 27' – 27 is shown in detail in FIGS. 9 to 12. Each intercepting member 27 comprises a pulley having a concave envelop surface and is journalled by trunnions 36 in ball bearings 37 received by bearing cases 38 which are mounted on bale case 11. Intermediate intercepting member 27' is of another construction to provide simultaneously cutting means for severing wires 15 and 25 after the tying of a bale. This intercepting member comprises a cylindrical shaft 39 which is rotatably and axially displaceably journalled in bores in two bearing blocks 40 which are in turn non-rotatably but axially displaceably journalled each in one bearing casing 41 mounted on bale case 11. One of the bearing blocks 40 has beneath shaft 39 a cutting edge 42 the other bearing block having an anvil 43. The bores in bearing blocks 40 are of sufficient axial length to allow the bearing blocks to be displaced towards each other in order to allow edge 42 to be engaged with anvil 43, and to be displaced from each other to the position shown in FIGS. 9 and 11 wherein shaft 39 is uncovered between the bearing blocks but is still journalled in these blocks over a sufficient axial length to prevent the shaft from sliding out of one of these bores. For operating the bearing blocks between the spaced position according to FIGS. 9 and 11 to the closed position wherein edge 42 is engaged with anvil 43 there is mounted on bale case 11 a double acting hydraulic ram 44 having two plungers 45 which are extendable and retractable at opposite ends thereof. These plungers are connected with bearing blocks 40 by means of double arm levers 46 pivoted between their ends on bale casing 11 in fulcrums 47 and forming ball joint ends 48 engaging grooves 49 in said blocks.

Figure 9:
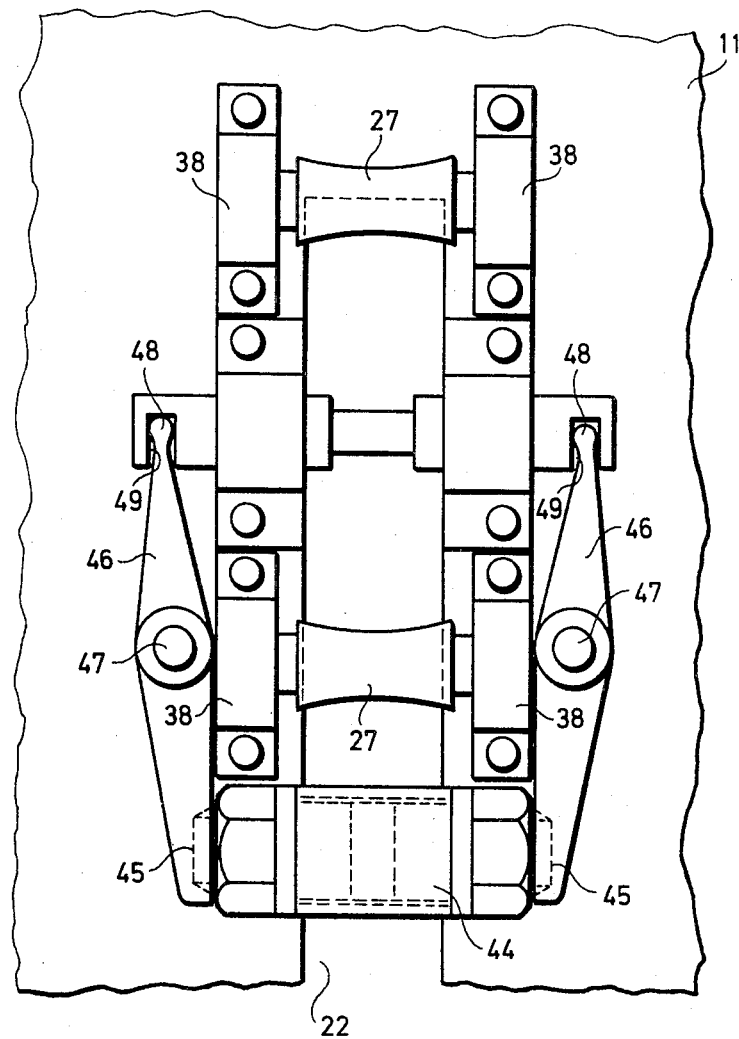
FIG. 9 is an enlarged plan view of the three intercepting members spaced in the longitudinal direction of the bale case and disposed at the upper side thereof.
Figure 10:
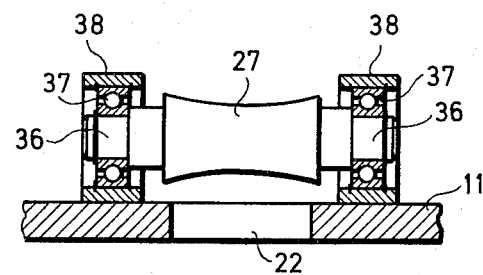
FIG. 10 is an axial sectional view of one of the two end intercepting members.
Figure 11:
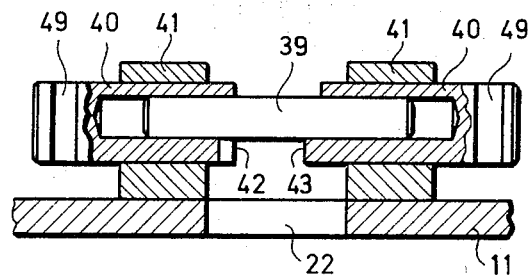
FIG. 11 is an axial sectional view, partly in elevation, of the central intercepting member.
Figure 12:
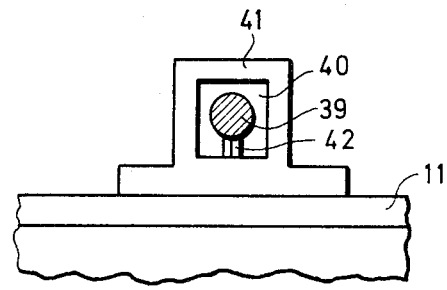
FIG. 12 is an end view of one of the elements of the cutting means and an associated bearing the shaft of the cutting means being shown in cross section.

When bearing blocks 40 are spaced according to FIGS. 9 and 11 the loops are formed of wires 15 and 25 in the manner described, and when these loops have been twisted to form knots the bearing blocks are closed to sever the wires beneath shaft 39 between cutting edge 42 and anvil 43 the bound bale thereby will be separated from the bale subsequently compacted in the bale case.

After the tying operation described further material will be compacted in bale case 11 by means of plunger 12 the bales previously formed at the same time being successively advanced in the bale case to be discharged successively therefrom. During this operation the top and bottom wires will be extended successively at the lower side and the upper side, respectively, of the material now compacted. When there has been compacted material to the length prescribed for a bale the tying operation will be repeated. Thus, at each end of a bale there will be performed twisting of each bottom wire and the associated top wire.

The baler may be provided with a bale length meter which will automatically interrupt the compacting of material in bale case 11 with plunger 12 in a forward position when the prescribed bale length has been obtained, and will restart the tying operation which may be automatically controlled by a timer.

The invention may be modified within the scope of the claims and may be utilized in connection with balers of other types than that described above for instance a baler having a vertical bale case.

What is claimed is:

1. In a bale press having a bale case and a plunger reciprocable in said bale case and forming at least one groove in the face thereof, a tying mechanism for bales comprising at least one needle reciprocable through said groove from one of two opposite sides of the bale case transversely thereof, said needle being forked to provide two legs; means for supplying a first wire to said one side of the bale case; three intercepting members spaced in the longitudinal direction of said bale case at the other one of said opposite sides; means for supplying a second wire to said other side of the bale case, said needle passing through the spaces between said intercepting members to engage said first and second wires and to form thereof two wire loops spaced in the longitudinal direction of said ball case; a wire twisting member opposite each of the spaces between said intercepting members for twisting said wire loops individually; two elements displaceable on the central intercepting member for movement towards and away from each other; co-operating cutting members on said elements disposed at the side of said central intercepting member which faces the bale case; and means for displacing said elements towards and away from each other to keep the elements spaced when the wire loops are formed and to thereafter sever the wires by means of the cutting members when said elements are displaced towards each other.

2. A tying mechanism as claimed in claim 1 in which said intermediate intercepting member comprises a shaft which is rotatably and axially displaceably mounted in said elements, and in which these elements are non-rotatably guided for displacement axially of said shaft.

3. A tying mechanism as claimed in claim 1 in which said wire twisters are operable to be displaced towards and away from the spaces between said intercepting members and each comprise a rotatable spindle having a twister hook mounted thereon, and in which there is provided close to each spindle an abutment for applying a wire loop caught by said hook against the surface of the spindle, said abutment being formed by a tube for each spindle and surrounding the spindle, said tubes being pivoted at the ends thereof opposite to said hook at their opposite edges and being resiliently biassed to abut each other.

* * * * *